United States Patent
Chakra et al.

(10) Patent No.: US 10,831,711 B2
(45) Date of Patent: Nov. 10, 2020

(54) PRIORITIZING LOG TAGS AND ALERTS

(71) Applicant: INTERNATIONAL BUSINESS MACHINES CORPORATION, Armonk, NY (US)

(72) Inventors: Al Chakra, Apex, NC (US); Jonathan Dunne, Dungarvan (IE); Liam S. Harpur, Dublin (IE); Sumit Patel, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/715,608

(22) Filed: Sep. 26, 2017

(65) Prior Publication Data

US 2019/0095440 A1 Mar. 28, 2019

(51) Int. Cl.
*G06F 16/17* (2019.01)
*G06F 16/16* (2019.01)

(52) U.S. Cl.
CPC ........ *G06F 16/164* (2019.01); *G06F 16/1734* (2019.01)

(58) Field of Classification Search
CPC ............................ G06F 16/164; G06F 16/1734
See application file for complete search history.

(56) References Cited

U.S. PATENT DOCUMENTS

| 9,122,546 | B1 | 9/2015 | Kaimal | |
|---|---|---|---|---|
| 2004/0162887 | A1* | 8/2004 | Dillon | G05B 19/4185 709/217 |
| 2011/0246826 | A1 | 10/2011 | Hsieh et al. | |
| 2012/0246303 | A1 | 9/2012 | Petersen et al. | |
| 2016/0335260 | A1 | 11/2016 | Convertino et al. | |
| 2016/0342453 | A1 | 11/2016 | Khan et al. | |
| 2017/0031741 | A1* | 2/2017 | Seigel | G06F 11/079 |
| 2017/0272377 | A1* | 9/2017 | McDonough | H04L 47/70 |

FOREIGN PATENT DOCUMENTS

| EP | 3107026 A1 | 12/2016 |
|---|---|---|
| WO | 2015187001 A2 | 12/2015 |

OTHER PUBLICATIONS

Loggly, "What is log management?", https://www.loggly.com/intro-to-log-management/, Dec. 29, 2016, pp. 1-8.

* cited by examiner

*Primary Examiner* — Kris E Mackes

(74) *Attorney, Agent, or Firm* — Cantor Colburn LLP; Teddi Maranzano

(57) ABSTRACT

A computer-implemented method includes associating a tag with a message in a log, where the message describes a logged event. A life parameter associated with the tag is calculated, using a computer processor, where the life parameter indicates a dynamic time period during which the tag remains in a state that is active. Alerting of the tag occurs by way of a first alert manner while the state of the tag is active. It is detected that the dynamic time period indicated by the life parameter has ended. The state of the tag is changed from active to dormant, where changing the state includes ceasing the alerting of the tag by way of the first alert manner.

18 Claims, 3 Drawing Sheets

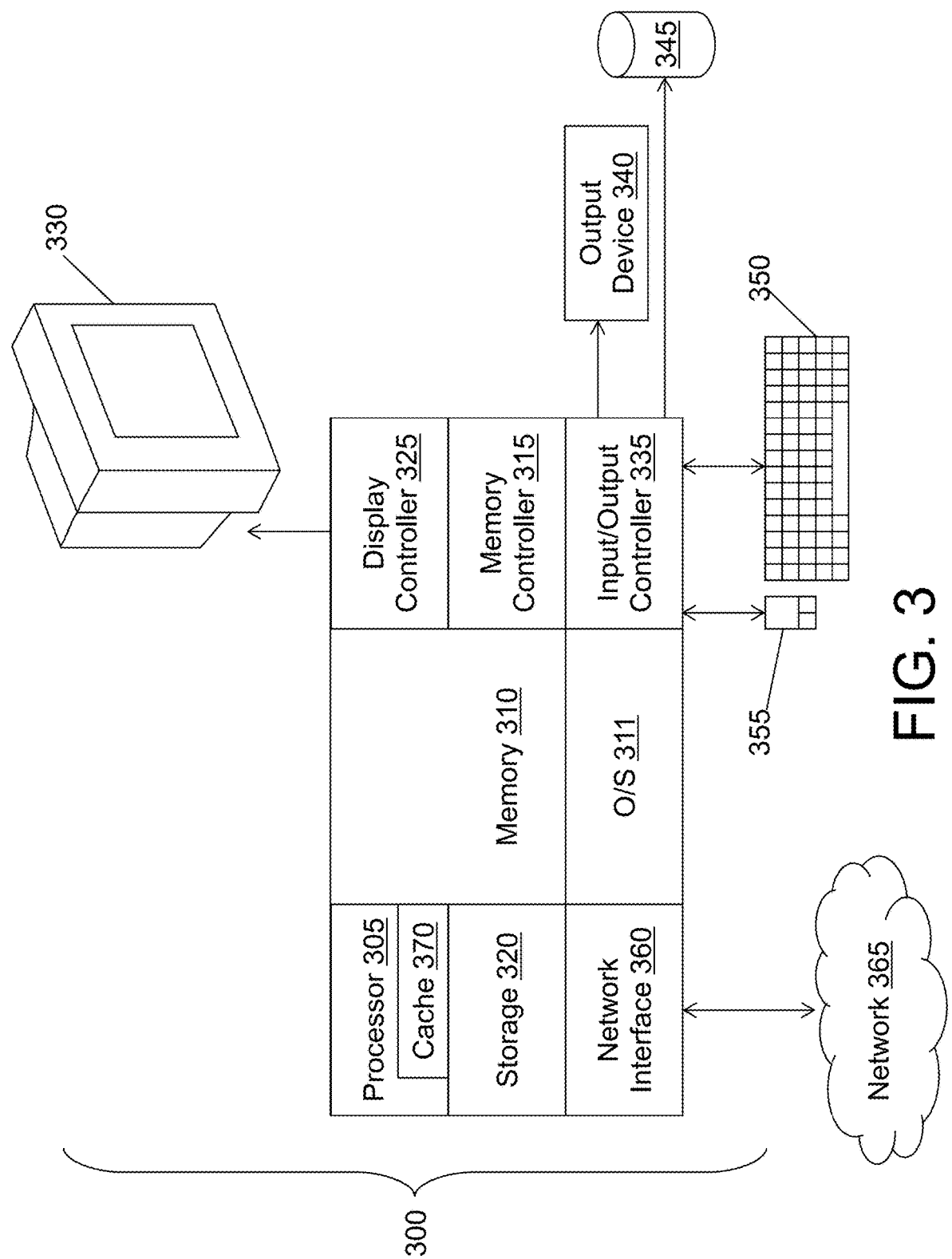

PRIORITIZING LOG TAGS AND ALERTS

BACKGROUND

The present invention relates to logging and, more specifically, to prioritizing log tags and alerts.

Many systems, both cloud and local, use logs to track events. For instance, each program crash or each attempt at authenticated login may be logged. Further, logs may describe resource utilization of the system, such as processor utilization or memory utilization. Generally, logs are stored as messages in one or more log files. These messages can be brief or verbose, for example, depending on the event being logged and depending on the design of the logging service.

Based on information in the logs, tags can be generated as annotations to portions of the logs. Generally, tagging may be based on rules, which may be defined by the system or user-defined, such that tags are generated as metadata to logged messages in accordance with those rules. For instance, if it is determined that a message in a log describes a critical event, the message is tagged as critical. In some cases, alerts are associated with tags. Some tags can automatically prompt alerts, which can be automatically managed or can be viewed by a user for manual handling.

SUMMARY

Embodiments of the present invention are directed to a computer-implemented method for prioritizing log tags and alerts. A non-limiting example of the computer-implemented method includes associating a tag with a message in a log, where the message describes a logged event. A life parameter associated with the tag is calculated, using a computer processor, where the life parameter indicates a dynamic time period during which the tag remains in a state that is active. Alerting of the tag occurs by way of a first alert manner while the state of the tag is active. It is detected that the dynamic time period indicated by the life parameter has ended. The state of the tag is changed from active to dormant, where changing the state includes ceasing the alerting of the tag by way of the first alert manner.

Embodiments of the present invention are directed to a system for prioritizing log tags and alerts. A non-limiting example of the system includes a memory having computer-readable instructions and one or more processors for executing the computer-readable instructions. The computer-readable instructions include associating a tag with a message in a log, where the message describes a logged event. Further according to the computer-readable instructions, a life parameter associated with the tag is calculated, where the life parameter indicates a dynamic time period during which the tag remains in a state that is active. Alerting of the tag occurs by way of a first alert manner while the state of the tag is active. It is detected that the dynamic time period indicated by the life parameter has ended. The state of the tag is changed from active to dormant, where changing the state includes ceasing the alerting of the tag by way of the first alert manner.

Embodiments of the invention are directed to a computer-program product for prioritizing log tags and alerts, the computer-program product comprising a computer-readable storage medium having program instructions embodied therewith. The program instructions are executable by a processor to cause the processor to perform a method. A non-limiting example of the method includes associating a tag with a message in a log, where the message describes a logged event. Further according to the method, a life parameter associated with the tag is calculated, where the life parameter indicates a dynamic time period during which the tag remains in a state that is active. Alerting of the tag occurs by way of a first alert manner while the state of the tag is active. It is detected that the dynamic time period indicated by the life parameter has ended. The state of the tag is changed from active to dormant, where changing the state includes ceasing the alerting of the tag by way of the first alert manner.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a block diagram of a computer system for implementing some or all aspects of the remediation system, according to some embodiments of this invention.

Figure 1:
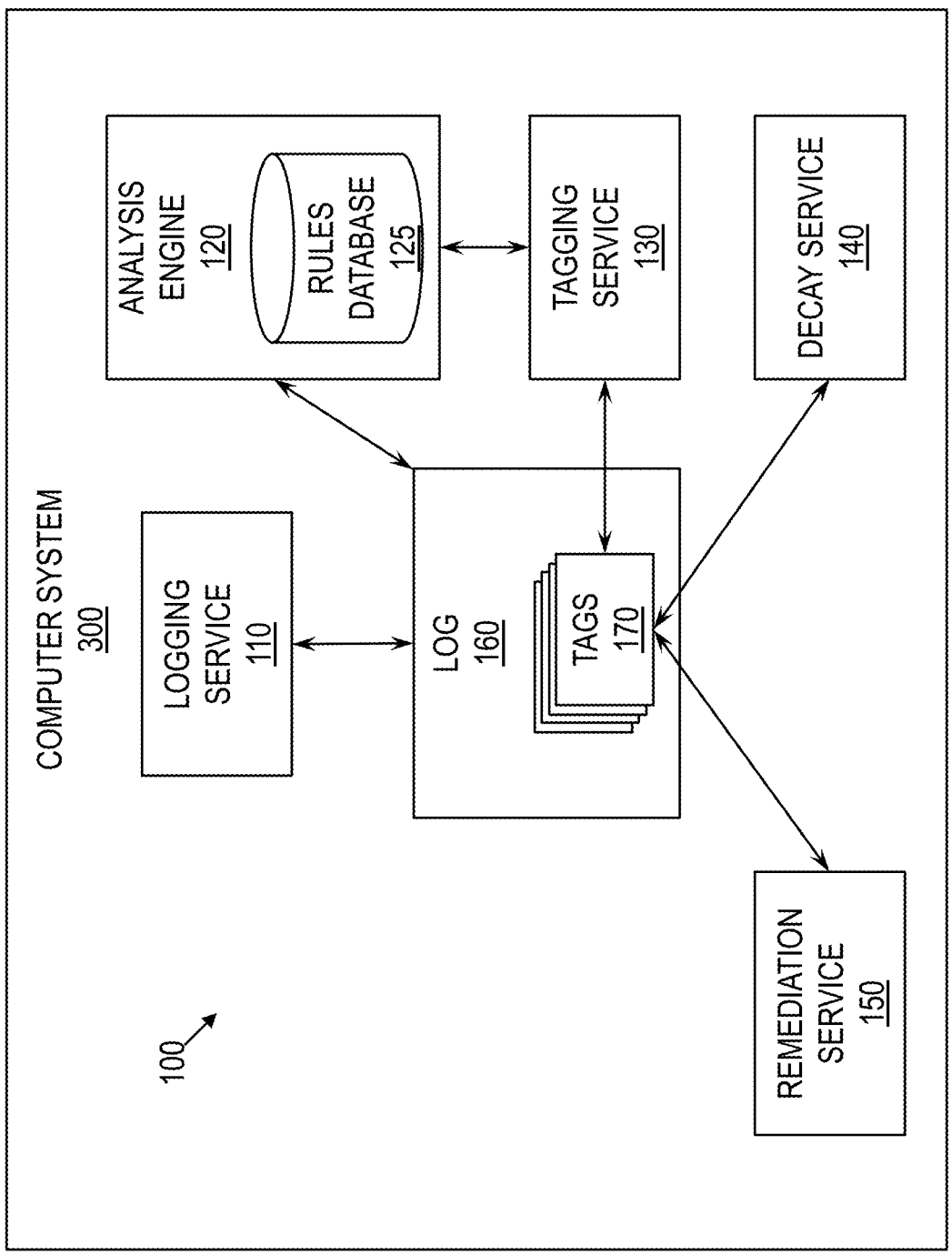
FIG. 1 is a block diagram of a remediation system, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, conventionally, alerts that result from logging are not prioritized. Each tag or various types of tags yield alerts, and these alerts can easily become noise to a user. It can be difficult to identify which alerts require attention and which can be ignored for the time being. Some tags, and thus some resulting alerts, are classified, and this classification can help a user in identifying alerts that require attention. However, classes can become overused, and in that cases, even within a particular class, a user may have difficulty prioritizing alerts.

Turning now to an overview of the aspects of the invention, one or more embodiments of the invention address the above-described shortcomings of the prior art by providing a mechanism for prioritizing alerts. According to some embodiments of the invention, statistical analyses are performed on user activities with respect to logs and alerts, and those analyses are used to determine a life parameter for each alert associated with a tag. The life parameter may determine how an alert decays over time, such that the alert may eventually become dormant and thus less visible to a user. Further, tags may be reclassified as classes become overused. This reclassification may reduce the noise within the various classes. In some embodiments of the invention, remediation in response to alerts may be performed automatically based on users' prior remediation in response to historical alerts. Thus, as a result, a user may be able to focus on alerts that are likely to require manual attention.

Turning now to a more detailed description of aspects of the present invention, FIG. 1 is a block diagram of a remediation system 100, according to some embodiments of this invention.

As shown in FIG. 1, the remediation system 100 includes a logging service 110, an analysis engine 120, a tagging service 130, a decay service 140, and a remediation service 150. Each of the logging service 110, the analysis engine 120, the tagging service 130, the decay service 140, and the remediation service 150 may be implemented through hardware, software, or a combination thereof. Specifically, for instance, each of these components may be performed by a distinct hardware device, such as a circuit. Generally, the logging service 110 may log activities of a computer system 300, which may be a local computing device, a remote computing device, a cloud system, or a combination thereof; the analysis engine 120 may analyze resulting logs 160 according to one or more rules for generating tags 170; the tagging service 130 may generate tags 170 based on the one or more rules; the decay service 140 may determine whether a respective alert associated with each tag 170 is active or dormant; and the remediation service 150 may detect manual remediation activities and may perform remedial activities in response to alerts that are based on tags 170.

The logging service 110 may be in communication with various other components, either hardware or software or both, so as to enable logging of events on the computer system 300. For instance, for the purpose of logging security-related activities, the logging service 110 may be in communication with an authentication service used to authenticate a user and provide access to secure aspects of the computer system 300. For another example, for the purpose of logging processor and memory utilization, the logging service 110 may have access to a resource monitoring facility of the computer system 300. It will be understood by one skilled in the art how to implement conventional logging, and the logging service 110 herein may use conventional logging techniques. In some embodiments of the invention, the logging service 110 generates a message for each event to be logged and writes the message in one or more log files, also referred to as logs 160. Thus, the one or more logs 160 may include a plurality of messages describing events that occurred on the computer system 300.

The analysis engine 120 may utilize a rules database 125 to identify messages in the logs 160 that should be tagged, and the tagging service 130 may tag messages accordingly. The rules database 125 maintains rules, each of which may be system-defined or user-defined, that define how messages in the logs 160 should be tagged. For example, a rule in the rules database 125 may specify that a certain login event, such as a failed login, should be tagged in a specific manner. For another example, a rule in the rules database 125 may specify that memory utilization over a threshold should be tagged in a specific manner. In other words, a tag 170 may be added to a message in the logs 160 associated with the failed login.

Each tag 170 may include metadata associated with the message being tagged and therefore associated with the event described by the message. In some embodiments of the invention, tags 170 are used to classify events represented in the logs 160, although this need not be the only usage of tags 170. Classes for tags 170 may include the following, for example informational, warning, minor, normal, critical, and fatal. For instance, it may be determined either manually or automatically that it is undesirable for memory utilization to reach a threshold point. Thus, a rule may be established in the rules database 125 that achieving this threshold is a critical event. When the memory utilization reaches the threshold, that memory utilization may be logged as a matter of course. The analysis engine 120 may read the message in the logs 160 indicating that this memory utilization was reached, and as a result, the tagging service 130 may tag that message as critical. In some embodiments, a tag 170 can belong to one or more classes. However, in some embodiments, certain groups of classes may be exclusive among themselves, such that a tag 170 cannot belong to more than a single class within that group at a given time. For instance, it may be the case that a tag 170 cannot be classified as both normal and critical at the same time.

In some cases, a tag 170 may be generated based on a recognized problem signature. In some embodiments of the invention, the remediation system 100 recognizes a problem signature and generates a new rule, which is inserted into the rules database 125, such that the new rule provides for a corresponding tag 170 based on instances of the problem signature in the future. A problem signature may be a series of events that, together, form or indicate a problem. For instance, a first message logged from a first program, tagged as a warning, followed with a second message from a second program, also tagged as a warning, may lead to a third program crashing, which may be tagged as fatal. As a result, the warning tags 170 in the first and second program may be a problem signature that implicitly warns of an expected crash in the third program. In some embodiments of the invention, the remediation system 100 recognizes problem signatures such as this, and the remediation system 100 may thus tag the second message related to the second program as fatal or may provide some other tag 170 indicating the recognition of the problem signature. As a result, a user may address the problem potentially before the third program crashes, or the remediation system 100 may automatically handle the problem. Automatic handling by the remediation system 100 may include performing remedial activities previously associated with the problem signature. Such remedial activities may have become associated with the problem signature by, for example, having been detected upon the manual performance of such remedial activities in response to a previous instance of the problem signature, or having been explicitly programmed by a user with instructions to perform such remedial activities in response to the problem signature.

In some embodiments, the identification of a problem signature occurs manually by a user, and the user adds a new rule to the rules database 125 to adjust tagging so as to provide an alert of the problem signature. For example, and not by limitation, as mentioned above, that alert may be associated with a tag 170 corresponding to the second message of the second program, after the first message from the first program has already been logged. It will be understood that this is an example and that various types of problem signatures may be recognized and the rules database 125 updated accordingly, manually or automatically. After updating the rules database 125, however, tagging of the problem signature may occur automatically for future instances of the problem signature.

In a conventional system, certain classifications of tags 170 may prompt alerts, which may be notifications to a user. In some conventional systems, for instance, all tags 170 prompt alerts. Upon receiving an alert, a user can then investigate to determine whether a change needs to be made to the computer system 300. However, according to some embodiments of this invention, alerting may be performed by a more robust mechanism that uses prioritization.

According to some embodiments of this invention, the decay service 140 may determine, at least in part, whether and how a user is alerted to the existence of a tag 170 and, thus, alerted to the associated event that was logged. The decay service 140 may calculate a life parameter for each tag 170 in the logs 160. A life parameter of a tag 170 may be a decay model representing a lifetime of the tag 170. Each tag 170 may be either active or dormant, where an active tag 170 prompts an alert and a dormant tag 170 need not prompt an alert. For instance, a dormant tag 170 may prompt a different type of alert that is less intrusive than an alert for an active tag 170, or a dormant tag 170 may prompt no alert at all. For example, and not by way of limitation, an alert for an active tag may be provided in the form of a dialog box presented to the user, while an alert for a dormant tag may be written in a list of alerts for the user to view at the user's own desire. The life parameter of a tag 170 may indicate a term, or time period, during which an alert associated with the tag 170 remains active. For example, and not by way of limitation, the life parameter may be an amount of time. When that amount of time passes after the tag 170 is generated, then the alert associated with the tag 170 may change from active to dormant.

The life parameter of a tag 170 may be determined through various mechanisms. In some embodiments, various characteristics of the tag 170 or associated event are considered when determining the life parameter. For example, and not by way of limitation, the remediation system 100, such as by way of the decay service 140, may calculate a quotient associated with each tag 170, and that quotient may map to a life parameter of the tag 170. The quotient, and thus the life parameter, may be based on a variety of characteristics of the tag 170. For instance, the following characteristics may be correlated, such as positively correlated, with the quotient of a tag 170: the frequency with which the tag 170 or related tags 170 appear in the logs 160; the frequency with which users perform remedial activities related to the tag 170; how long users spend performing those remedial activities; the frequency with which users view associated messages of the tag 170 in the logs 160; impact on resource utilization of the event associated with the tag 170. In other words, generally, the life parameter may be based on statistics indicating users' level of interest in the tag 170, as well as the impact of the associated event on resources. Further, in some embodiments, classification of the tag 170 may also play a role in determining the life parameter, the quotient, or both. In some embodiments of the invention, the quotients of tags 170 may be determined through statistical analysis, such as regression, to compare frequency, severity, and other characteristics associated with the tags 170.

An example mapping of quotients to life parameters follows in the below table, where the life parameter represents a number of days for which the associated tag 170 is active before becoming dormant:

| Quotient | Life Parameter |
| --- | --- |
| 0-0.2 | 30 |
| 0.21-0.4 | 60 |
| 0.41-0.6 | 120 |
| 0.61-0.8 | 360 |
| 0.81-1.0 | Never expires |

It will be understood that the above table is provided for illustrative purposes only. Depending on the design of the remediation system 100, for example, values of the quotient may be in a different range than those shown, values of the life parameter may be in a different range than those shown, or the mapping between quotients and life parameters may differ.

In some embodiments of the invention, the time period indicated by the life parameter is dynamic, and may be changeable manually or automatically by various mechanisms. Further, in some embodiments of the invention, the remediation system 100 modifies the life parameter of a tag 170 based on user activities. For example, and not by way of limitation, a user may manually indicate a desire change the life parameter of a tag 170 or may upgrade or downgrade an alert associated with the tag 170, and the remediation system 100 may update the life parameter accordingly. In some embodiments of the invention, remedial activities performed by a user and related to the tag 170 may affect the life parameter, such as by increasing it. Various mechanisms may be used to determine that a remedial activity is associated with a tag 170. For example, and not by way of limitation, if a user views a tag 170 prior to performing the remedial activity, or if the remedial activity changes a state of the computer system 300 related to the associated event (e.g., such as reducing memory utilization when the associated event is memory utilization exceeding a threshold), then the remediation system 100 may assume that the remedial activity is associated with the tag 170. Further, the timing within which the user takes a remedial activity associated with the tag 170 may affect how the life parameter changes. For instance, if remedial action is performed relatively quickly, then the tag 170 may be given high priority and thus a higher life parameter. In general, in some embodiments of the invention, prioritization of a tag 170 may correlate with the life parameter, such that a relatively high-priority tag 170 may be assigned a relatively high life parameter, as compared to a tag 170 having lower priority.

After the life parameter of a tag 170 is established, the tag 170 and its associated alert may remain active beginning at a start time and for a span of time that is based on, or equal to, the value of the respective life parameter. In some embodiments of the invention, the start time is the time the tag 170 was generated, but alternative start times may also be used. For example, for each tag 170 that is active, the remediation system 100 may issue an alert associated with that tag 170. The alert itself may take various forms. For example, and not by way of limitations, the alert may be a notification given in a dialog box, an email to a user, or another form of notification. Further, in some embodiments of the invention, the alert for a tag 170 may be repeated one or more times or may remain persistent while the alert is active. The type of alert issued for tag 170 may be dependent, at least in part, on the classification of the tag 170, such that a certain classification leads to a certain type of alert or increases the likelihood that a certain type of alert will be used for the tag 170.

In some embodiments, an alert may include text with a problem insight, which may be actionable advice regarding potentially helpful remedial activities. A problem insight may be based on prior remedial actions detected as taken by a user in response to one or more similar tags 170 historically. Further, in some embodiments of the invention, the remediation service 150 may perform such a remedial action, alternatively or in addition to the alert being issued.

After the time indicated by the life parameter passes, the alert and the tag 170 associated with the life parameter may become dormant. Generally, a dormant tag 170 may have less visibility than an active tag 170, but being dormant need not require the tag 170 to be removed or deleted. Rather, in some embodiments of the invention, the remediation system 100 no longer issues alerts for dormant tags 170, or alerts occur with less frequency or in a less visible manner.

In some cases, a class used for classifying tags 170 may become noisy. In other words, a large number of tags 170 may be classified into that class. This may prove problematic if, for example, alerts are grouped based on tags 170, or alert type is based on classification. In such cases, alerts that a user might want to see within a class may be buried within alerts for tags 170 the user has no interest in at a given time. Thus, in some embodiments of the invention, the remediation system 100 may reclassify tags 170, which may include changing the classification of one or more existing tags 170, modifying classification rules so that one or more future tags 170 are not classified in the class or both. In some embodiments of the invention, this reclassification is performed manually, such as by notifying the user of the existence of a noisy class, or the reclassification is performed automatically. For example, and not by way of limitation, the reclassification may be performed by establishing a new threshold for dividing the class. For instance, if tags 170 related to resource utilization have been classified as critical when resource utilization is over an initial threshold, and if the critical class is deemed too noisy (e.g., having over a threshold quantity of tags 170), then the remediation system 100 may automatically establish a higher threshold, and each existing or future tag 170 above the higher threshold may be classified in a different class, such as a class labeled Critical 2. For another example, however, existing tags 170 may remain in the noisy class, while future tags 170 that would have been placed in that class are added to a new class or to some class other than the noisy one. In some embodiments of the invention, reclassification includes sub-classification, such that a new class is created within the noisy class to further distinguish between tags 170 in that class.

To further reduce the noise of alerts, some embodiments of the remediation system 100 may remove or ignore tags 170 related to events that are collected at the application programming interface (API) level or elsewhere. For example, in some computer systems 300, login and logout events may be handled at the API level and thus need not be logged. As such, the remediation system 100 need not generate tags 170 or issue alerts for such events.

Figure 2:
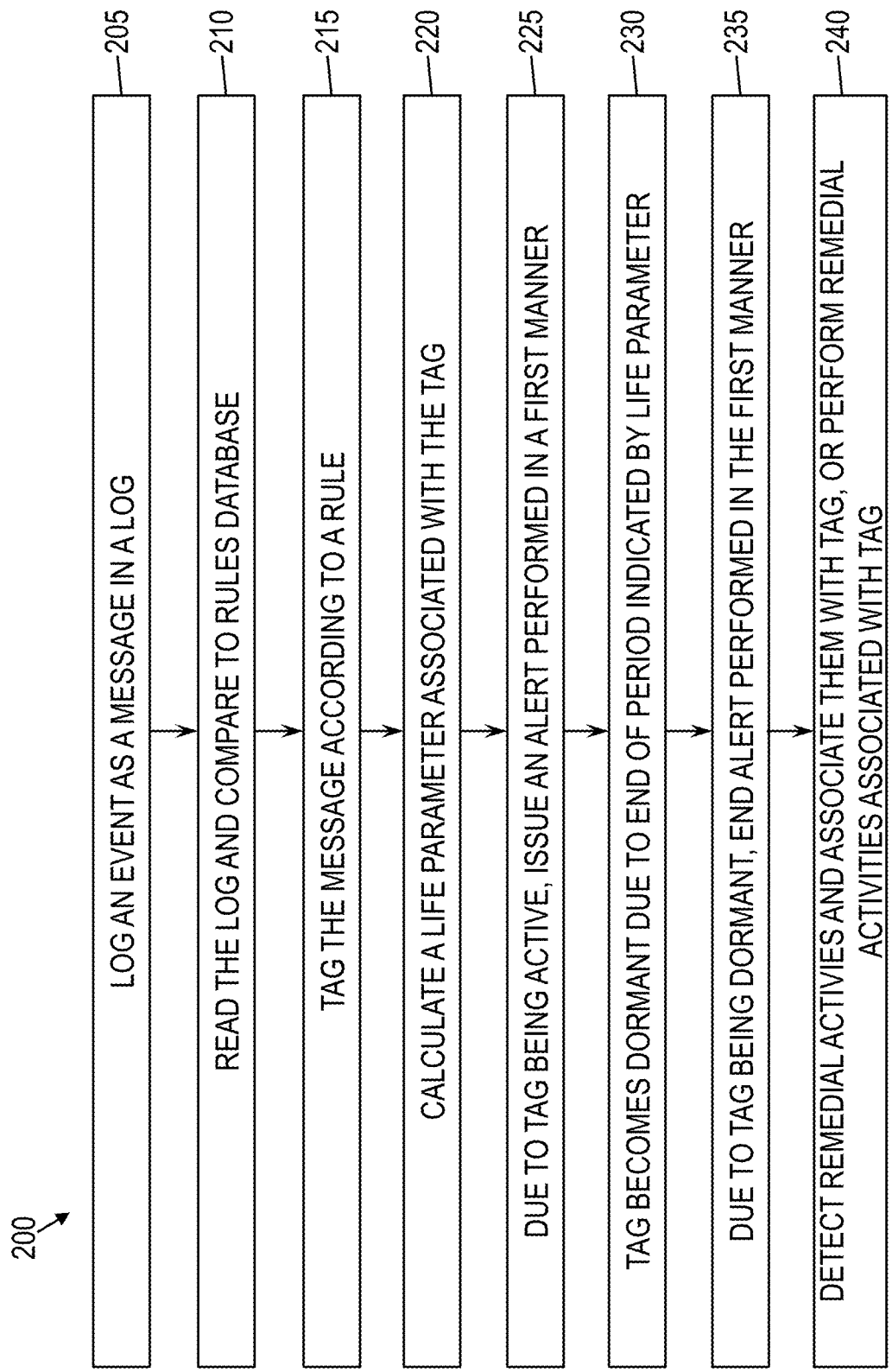
FIG. 2 is a flow diagram of a method for remediating a logged event, according to some embodiments of this invention.

FIG. 2 is a flow diagram of a method 200 for remediating a logged event, according to some embodiments of this invention. As shown in FIG. 2, at block 205, the logging service 110 may log a detected event by generating a message in a log 160. At block 210, the analysis engine 120 may read the log and compare the message to the rules database 125. At block 215, as a result of the analysis engine 120 determining that the message meets the criteria of a rule, the tagging service 130 may tag the message. In some cases, this tag may indicate a problem signature or may be based on recognition of a problem signature. At block 220, the decay service 140 may calculate a life parameter for the tag 170. At block 225, an alert may be issued associated with the tag 170, where that alert is performed in a first manner while the tag is active, and where the tag is active for a time period indicated by the life parameter of the tag 170. At block 230, the tag becomes dormant due to the time period ending. At block 235, the alert performed in a first manner ends based on the tag being dormant. Further, in some embodiments of the invention, an alert may issue in a second manner in association with the tag when the tag is dormant, where the second manner differs from the first. Further, in some embodiments of the invention, at block 240, the remediation service 150 detects one or more remedial activities manually performed in relation to the tag 170, or the remediation service 150 performs one or more remedial activities already associated with the tag. It will be understood that block 240, along with other blocks in the method 200, need not occur chronologically where indicated in FIG. 2. In some embodiments of the invention, automatic remedial activities may be prioritized based at least in part on tag priority, as reflected in the life parameter.

Thus, according to some embodiments of the invention, the remediation system 100 is enabled to clean up the noise of alerting so that a user can focus on tags that have high priority. Further, due to automatic remediation performed in response to tags in some embodiments of the invention, the quantity of alerts may be reduced and the computer system 300 may run more effectively.

FIG. 3 illustrates a block diagram of a computer system 300 for use in implementing a remediation system 100 or method according to some embodiments. The remediation systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the remediation systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Remediation systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
   associating a tag with a message in a log, wherein the message describes a logged event;
   calculating, using a computer processor, a life parameter associated with the tag, wherein the life parameter indicates a dynamic time period during which the tag remains in a state that is active;
   alerting of the tag by way of a first alert manner while the state of the tag is active;

detecting a remedial activity performed manually in response to the tag and a duration between the alerting and the performance of the remedial activity;

modifying the life parameter based on the remedial activity and based on the duration wherein the modification to the life parameter is inversely related to the duration;

detecting that the dynamic time period indicated by the life parameter has ended; and changing the state of the tag from active to dormant, wherein the changing the state comprises ceasing the alerting of the tag by way of the first alert manner.

2. The computer-implemented method of claim 1, wherein the calculating comprises:

determining a quotient based on one or more characteristics of the tag, wherein the quotient is determined through statistical analysis; and mapping the quotient to the life parameter.

3. The computer-implemented method of claim 1, wherein the tag is based on a problem signature comprising the logged event and one or more other events.

4. The computer-implemented method of claim 1, further comprising alerting of the tag by way of a second alert manner while the state of the tag is dormant, wherein the second manner differs from the first manner.

5. The computer-implemented method of claim 1, further comprising:

identifying a remedial activity performed manually in response to a previous tag related to the tag; and performing the remedial activity in response to the tag, based on the remedial activity being performed manually in response to the previous tag related to the tag.

6. The computer-implemented method of claim 1, wherein the calculating the life parameter is based at least in part on a priority of the tag.

7. The computer-implemented method of claim 1, wherein modifying the life parameter based on the remedial activity and based on the duration includes increasing the life parameter based on the remedial activity.

8. A system comprising:

a memory having computer-readable instructions; and one or more processors for executing the computer-readable instructions, the computer-readable instructions comprising:

associating a tag with a message in a log, wherein the message describes a logged event;

calculating a life parameter associated with the tag, wherein the life parameter indicates a dynamic time period during which the tag remains in a state that is active;

alerting of the tag by way of a first alert manner while the state of the tag is active;

detecting a remedial activity performed manually in response to the tag and a duration between the alerting and the performance of the remedial activity;

modifying the life parameter based on the remedial activity and based on the duration, wherein the modification to the life parameter is inversely related to the duration;

detecting that the dynamic time period indicated by the life parameter has ended; and changing the state of the tag from active to dormant, wherein the changing the state comprises ceasing the alerting of the tag by way of the first alert manner.

9. The system of claim 8, wherein the calculating comprises:

determining a quotient based on one or more characteristics of the tag, wherein the quotient is determined through statistical analysis; and mapping the quotient to the life parameter.

10. The system of claim 8, wherein the tag is based on a problem signature comprising the logged event and one or more other events.

11. The system of claim 8, the computer-readable instructions further comprising alerting of the tag by way of a second alert manner while the state of the tag is dormant, wherein the second manner differs from the first manner.

12. The system of claim 8, the computer-readable instructions further comprising:

identifying a remedial activity performed manually in response to a previous tag related to the tag; and performing the remedial activity in response to the tag, based on the remedial activity being performed manually in response to the previous tag related to the tag.

13. The system of claim 8, wherein the calculating the life parameter is based at least in part on a priority of the tag.

14. A computer-program product for prioritizing log tags and alerts, the computer-program product comprising a computer-readable storage medium having program instructions embodied therewith, the program instructions executable by a processor to cause the processor to perform a method comprising:

associating a tag with a message in a log, wherein the message describes a logged event;

calculating a life parameter associated with the tag, wherein the life parameter indicates a dynamic time period during which the tag remains in a state that is active;

alerting of the tag by way of a first alert manner while the state of the tag is active;

detecting a remedial activity performed manually in response to the tag and a duration between the alerting and the performance of the remedial activity;

modifying the life parameter based on the remedial activity and based on the duration wherein the modification to the life parameter is inversely related to the duration;

detecting that the dynamic time period indicated by the life parameter has ended; and changing the state of the tag from active to dormant, wherein the changing the state comprises ceasing the alerting of the tag by way of the first alert manner.

15. The computer-program product of claim 14, wherein the calculating comprises:

determining a quotient based on one or more characteristics of the tag, wherein the quotient is determined through statistical analysis; and mapping the quotient to the life parameter.

16. The computer-program product of claim 14, wherein the tag is based on a problem signature comprising the logged event and one or more other events.

17. The computer-program product of claim 14, wherein the method further comprises alerting of the tag by way of a second alert manner while the state of the tag is dormant, wherein the second manner differs from the first manner.

18. The computer-program product of claim 14, wherein the method further comprises:

identifying a remedial activity performed manually in response to a previous tag related to the tag; and performing the remedial activity in response to the tag, based on the remedial activity being performed manually in response to the previous tag related to the tag.

* * * * *